United States Patent [19]
Tatsuta et al.

[11] 4,059,765
[45] Nov. 22, 1977

[54] GAMMA-RAY SCINTILLATION DETECTOR

[75] Inventors: Hatsumi Tatsuta; Shigeru Kumazawa, both of Mito, Japan

[73] Assignee: Japan Atomic Energy Research Institute, Tokyo, Japan

[21] Appl. No.: 676,803

[22] Filed: Apr. 14, 1976

[30] Foreign Application Priority Data

Apr. 24, 1975   Japan .................................. 50-49996

[51] Int. Cl.² ............................................... G01T 1/20
[52] U.S. Cl. ................................. 250/367; 250/361 R
[58] Field of Search ............... 250/354, 367, 511, 512, 250/486, 487, 460, 233, 482; 354/49

[56] References Cited

U.S. PATENT DOCUMENTS

| 2,226,602 | 12/1940 | Frost | 354/49 |
| 2,748,289 | 5/1956 | Urbach | 250/487 |
| 3,263,080 | 7/1966 | Cowper et al. | 250/482 |
| 3,519,820 | 7/1970 | Erikson | 250/367 |
| 3,906,234 | 9/1975 | Conrad et al. | 250/366 |

Primary Examiner—Harold A. Dixon
Attorney, Agent, or Firm—Stevens, Davis, Miller & Mosher

[57] ABSTRACT

A plurality of independent scintillators are used to measure radiation dose rate. The opening of a light shielding shutter locating the scintillators and a photomultiplier is adjusted to maintain linear proportional relationship between the counting rate and the dose rate.

2 Claims, 4 Drawing Figures

GAMMA-RAY SCINTILLATION DETECTOR

BACKGROUND OF THE INVENTION

This invention relates to measurement for γ-ray dose rate. The γ-ray dose rate counters commonly used in the atomic energy facilities are generally operating at low dose rate, but in abnormal conditions they are operating at extremely high dose rate. Therefore, it is desirable that all the dose rate meters can operate to measure the dose rate without substantial error in the indication even at the high dose rate. This invention particularly relates to a detector in which the dose rate can be measured over a quite wide range of dose rate by only one detector within allowable error limit from a low dose rate to a high dose rate which may reach beyond a practically anticipated value.

In the system for measuring dose rate of the prior art, in the region of low dose rate Geiger-Muller (GM) counting tubes or scintillation detectors having linearity in that region are utilized while in the region of high dose rate ionization chamber detectors having linearity in that region are utilized. Therefore, it has been necessary to change the kind of GM counting tube having different γ-ray efficiency according to the dose rate or to change the kind of scintillator having different scintillation efficiency from large size to small size as the dose rate increases, in order to measure a wide range of dose rate using only one kind of device.

The prior system explained above is not only economically quite advantageous but also extremely complicated in operation itself.

SUMMARY OF THE INVENTION

A combination of organic scintillators and light shielding shutters, the opening of the shutters being able to be adjusted, provided in accordance subject invention can prevent the counting circuit from mulfunctioning due to uncounting which may occur at high dose rate and can avoid interchange of the kind of the scintillators. The scintillators used in this invention have higher γ-ray efficiency than GM counting tube and, therefore, the object of this invention is to provide a γ-ray scintillation detector which is free from the defects of the prior art.

DESCRIPTION OF THE PREFERRED EMBODIMENT

Figure 1:
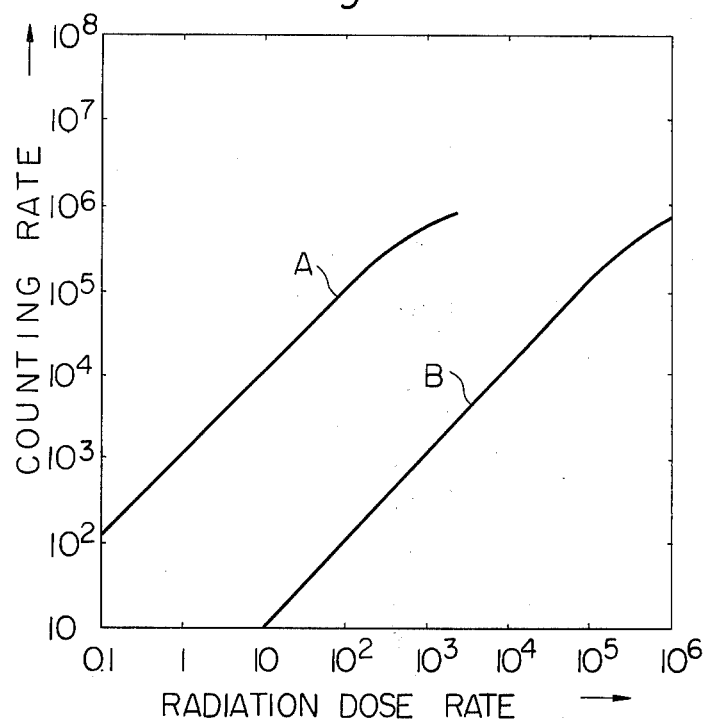
FIG. 1 shows counting rate curves A and B which are the relationships between counting rate and radiation dose rate.

Two counting ratio curves A and B in FIG. 1 give the relationships between the counting rate of the electric pulses in a photomultiplier tube and the radiation dose rate under a γ-ray radiation to a plastic scintillator, where in curve A the volume of the scintillator is 0.78 cm$^3$ and in curve B the volume of the scintillator is 0.8 × 10$^{-3}$ cm.

The volume ratio between the two scintillators is about 1000 and the counting ratio of the electric pulse for the same dose rate is also about 1000. However, as is shown in the curves, in the radiation range where the counting ratio exceeds 10$^5$ count/min. the linear proportional relationship between the counting ratio and the radiation dose rate cannot be maintained with the two plastic scintillators due to the characteristic feature in the electric circuit.

As it is noted from the curves that the upper limit of the radiation dose rate range where the linear proportional relationship between the counting ratio and the radiation dose rate is maintained is expanded by a factor K, where 1/K is the factor by which the volume of the plastic scintillator is reduced, the linear proportional relationship can ultimately be maintained without saturation of the counting rate up to the maximum radiation dose rate of the single scintillator where the linear proportional relationship between the counting rate of electrical signal pulses and the radiation dose rate is maintained, by a process in which a plurality of plastic scintillators with small volume are gathered together and the number of the scintillators to be used for measuring the light is reduced by using a respective light shielding shutter with increasing radiation dose rates.

Figure 2:
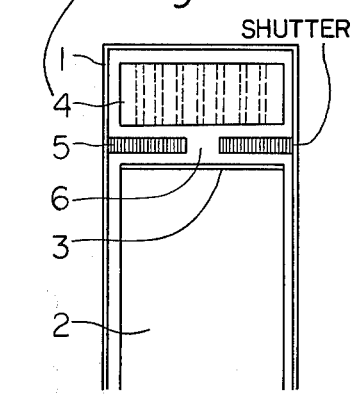
FIG. 2 is a longitudinal cross section of an embodiment of this invention.
Figure 3:
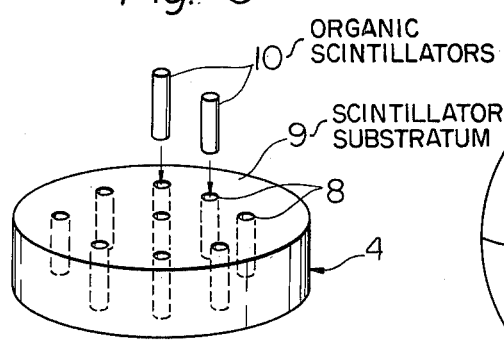
FIG. 3 shows the scintillator part of the embodiment shown in FIG. 2.
Figure 4:
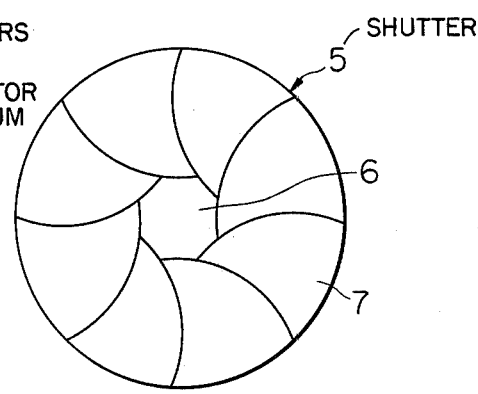
FIG. 4 shows the light shielding shutter part of the embodiment shown in FIG. 2.

In FIGS. 2 to 4, the γ-ray scintillation detector of the subject invention comprises a scintillator part 4 and a light shielding shutter part 5. The scintillator part comprises a scintillator substratum 9 made of metal, carbon or organic material with a plurality of penetrations 8 and organic scintillators 10 tightly embedded into the penetrations. The light shielding shutter part comprises a plurality of light shielding metallic slices 7 which move to adjust the area of light passing through opening 6 by an external force manually or mechanically through some combination of gears and cam mechanism.

In FIG. 2, particularly, a photomultiplier tube 2 is set within a metallic case 1 for protecting the detector and the light shielding shutter 5 is inserted in front of a photoemissive surface 3 of the photomultiplier tube 2 with some gap therebetween. The light passing through opening 6 of the light shielding shutter 5 can be adjusted from outside of the metallic case 1 to modify the fluorescent quantity impinging upon the photoemissive surface 3 from the scintillator part 4.

In the invention of subject application, the effect of actual reducing the size of scintillators is equivalently obtained by working the light shielding shutter with the succeeding increment of radiation dose rate and, therefore, the saturation in the counting rate can be avoided up to an extremely high radiation dose rate while the counting rate will saturate in the prior art when the counting rate exceeds about 10$^5$ count/min.

In lieu of the embedded scintillator shown in FIG. 3 can be used a fibrous organic scintillator can be used with the outside thereof coated by light shielding material or light reflecting material or a pellet type organic scintillator attached to a substrate. A variety of light opening adjusting means can be used with means controlling the adjusting means other than those disclosed in FIG. 4.

What is claimed is:

1. A γ-ray scintillation detector for measuring radiation dose rate comprising:

a scintillator substratum provided with a plurality of independent scintillators, a photomultiplier tube facing the scintillator substratum, and a light shielding shutter locating between the scintillator substratum and the photomultiplier, the opening of said shutter through which light passes through being adjustable.

2. A γ-ray scintillation detector of claim 1, wherein the adjustment of the opening is stepwise adjustable for decreasing the fluorescent luminous quantity impinging upon the photo-multiplier, said fluorescent luminous quantity varying in proportion to the increment of the γ-ray dose rate, thereby maintaining a linear proportional relationship between the counting rate and the dose rate over a wide range from low dose rate to high dose rate.

* * * * *